(12) United States Patent
Jain et al.

(10) Patent No.: US 7,836,041 B1
(45) Date of Patent: Nov. 16, 2010

(54) SYSTEM AND METHOD FOR DISPLAYING BOTH TIME INFORMATION SEARCH RESULTS AND INTERNET SEARCH RESULTS

(75) Inventors: Sanjay Jain, Bangalore (IN); Vivek Kumar, Bangalore (IN); Krzysztof Wieslaw Czuba, New York, NY (US)

(73) Assignee: Google Inc., Mountain View, CA (US)

( * ) Notice: Subject to any disclaimer, the term of this patent is extended or adjusted under 35 U.S.C. 154(b) by 423 days.

(21) Appl. No.: 12/075,420

(22) Filed: Mar. 10, 2008

Related U.S. Application Data

(60) Provisional application No. 60/893,873, filed on Mar. 8, 2007.

(51) Int. Cl.
*G06F 17/00* (2006.01)
(52) U.S. Cl. .................. 707/706; 707/707; 707/708; 707/725; 707/728; 707/729; 707/731; 707/764
(58) Field of Classification Search .......... 707/999.003, 707/999.005, 999.01, 999.107, 706, 707, 707/708, 725, 728, 729, 731, 764
See application file for complete search history.

(56) References Cited

U.S. PATENT DOCUMENTS

| | | | | |
|---|---|---|---|---|
| 5,448,532 A * | 9/1995 | Kataoka et al. | ............... | 368/10 |
| 5,930,474 A * | 7/1999 | Dunworth et al. | ........... | 709/217 |
| 6,233,204 B1 * | 5/2001 | Chu et al. | ..................... | 368/21 |
| 6,249,486 B1 * | 6/2001 | Chitturi | ........................ | 368/21 |
| 6,938,051 B1 * | 8/2005 | Burger et al. | ....................... | 1/1 |
| 7,054,870 B2 * | 5/2006 | Holbrook | ............................ | 1/1 |
| 7,257,570 B2 * | 8/2007 | Riise et al. | .................. | 707/706 |
| 7,447,509 B2 * | 11/2008 | Cossins et al. | ................. | 455/457 |
| 7,469,247 B2 * | 12/2008 | Cossins et al. | ..................... | 1/1 |
| 7,599,988 B2 * | 10/2009 | Frank | .......................... | 709/203 |
| 7,664,767 B2 * | 2/2010 | Virdy | ................................ | 1/1 |
| 7,668,811 B2 * | 2/2010 | Janssens et al. | ..................... | 1/1 |
| 7,685,191 B1 * | 3/2010 | Zwicky et al. | .............. | 707/706 |
| 2004/0177069 A1 * | 9/2004 | Li et al. | ......................... | 707/5 |
| 2005/0154718 A1 * | 7/2005 | Payne et al. | .................... | 707/3 |
| 2008/0104227 A1 * | 5/2008 | Birnie et al. | ................ | 709/224 |

* cited by examiner

*Primary Examiner*—Don Wong
*Assistant Examiner*—Thanh-Ha Dang
(74) *Attorney, Agent, or Firm*—Morgan, Lewis & Bockius LLP

(57) ABSTRACT

A method of processing information and producing search response is performed at a server system. A search query is received from a client system or device. An Internet database is searched to identify a set of documents accessible via the Internet that match the search query, and a first response having information identifying at least a portion of the identified set of documents is generated. In addition, a determination is made as to whether the search query meets predefined criteria associated with current time inquiries. If the search query is determined to meet the predefined criteria associated with current time inquiries, a second response specifying a current time for at least one location is generated, and the first response and second response are returned to the client system or device for simultaneous display at the client system or device.

32 Claims, 14 Drawing Sheets

| File | Edit | View | Go | Bookmarks | Tools | Help | http://www.searchenginewebsite.com |

Google

Web  Images  Video  News  Maps  more »

[time_____] Search   Advanced Search
                              Preferences
— 301

Web    Results 1 - 10 of about 2,000,000,000 for time [definition]. (0.30 seconds)

<u>Time Clock</u>                    Sponsored Link          Sponsored Links
www.TimeClockPlus.com   True. Real-Time Time Keeping Solutions.
for Today's Business.                                  <u>Current time</u>
                                                       Get better answers and references
<u>Breaking News, Analysis, Opinions, Multimedia and Blogs</u> | on Ask.com. Use Ask.com now!
TIME                                               www.ask.com
News Magazine - The official home of TIME Magazine online,
presenting the top news stories of the day and current events from  <u>World Time Zone Clocks</u>
around the globe."                                     We have the largest range of modern
www.time.com/ - Mar 6, 2007 - <u>Similar pages</u>    timezone clocks on the internet.
                                                       www.contemporaryheaven.co.uk
<u>Time's Person of the Year: You -- TIME</u>
In 2006, the World Wide Web became a tool for bringing together
the small contributions of millions of people and making them
matter.
www.time.com/time/magazine/article/0,9171,1569514,00.html -
38k - <u>Cached</u> - <u>Similar pages</u>
[ <u>More results from www.time.com</u> ]

<u>The official US time</u>
The official US time. Public service cooperatively provided by the two time agencies of
United States: a civilian agency, the National Institute of...
www.time.gov/ - 12k - <u>Cached</u> - <u>Similar pages</u>

SYSTEM AND METHOD FOR DISPLAYING BOTH TIME INFORMATION SEARCH RESULTS AND INTERNET SEARCH RESULTS

RELATED APPLICATIONS

The application claims priority under 35 U.S.C. 119 to U.S. Provisional Patent Application No. 60/893,873, "System and Method for Displaying Both Time Information Search Results and Internet Search Results," filed on Mar. 8, 2007.

TECHNICAL FIELD

The disclosed embodiments relate generally to the presentation of time information in various locations or the current location of a user of a client device, and in particular, to a system and method of presenting responses to search queries related to time information in various locations or the current location of a user of a client device.

BACKGROUND

Internet search engines allow users to search for and find an abundance of information related to virtually any topic. Typically, a user submits a search query using key terms and the search engine returns various search responses matching that search query. The search responses are produced and displayed according to various criteria that the search engine developer has created. Often, the search responses encompass a wide variety of documents and are not categorized according to any particular criteria.

SUMMARY

In accordance with some embodiments, a method of processing information and producing search results is performed at a server system. A search query is received from a client system or device. An Internet database is searched to identify a set of documents accessible via the Internet that match the search query, and a first response having information identifying at least a portion of the identified set of documents is generated. In addition, a determination is made as to whether the search query meets predefined criteria associated with current time inquiries. If the search query is determined to meet the predefined criteria associated with current time inquiries, a second response specifying a current time in a plurality of locations is generated, and the first response and second response are returned to the client system or device for simultaneous display at the client system or device. If the search query is determined not to meet the predefined criteria associated with current time inquiries, the first response is returned to the client system or device for display at the client system or device.

In accordance with some embodiments, a method of processing information and producing search results is performed at a server system. A search query is received from a client system or device having an IP address. An Internet database is searched to identify a set of documents accessible via the Internet that match the search query, and a first response having information identifying at least a portion of the identified set of documents is generated. In addition, a determination is made as to whether the search query meets predefined criteria associated with current time inquiries and does not specify a location. If the search query is determined to meet the predefined criteria associated with current time inquiries and if the search query does not specify a location, the location associated with the IP address of the client system or device is determined. A second response specifying a current time at the location associated with the IP address of the client system or device is generated, and the first response and second response are returned to the client system or device for simultaneous display at the client system or device. If the search query is determined not to meet the predefined criteria associated with current time inquiries, the first response is returned to the client system or device for display at the client system or device.

In accordance with some embodiments, a method of processing information and producing search results is performed at a client system. A search query having a current time inquiry that meets predefined criteria is received from a user. The search query is transmitted to a search engine server system. First and second responses are received from the search engine server system. The first response has information identifying a set of documents accessible via the Internet that match the search query, and the second response specifies a current time in a plurality of locations. The first and second responses are simultaneously displayed.

In accordance with some embodiments, a method of processing information and producing search results is performed at a client system having an IP address. A search query having a current time inquiry that meets predefined criteria and does not specify a location is received from a user. The search query is transmitted to a search engine server system. First and second responses are received from the search engine server system. The first response has information identifying a set of documents accessible via the Internet that match the search query, and the second response specifies a current time at the location associated with the IP address of the client system or device. The first and second responses are simultaneously displayed.

BRIEF DESCRIPTION OF THE DRAWINGS

The aforementioned aspects of the invention as well as additional aspects thereof will be more clearly understood herein after as a result of the following detailed description of embodiments of the invention when taken in conjunction with the drawings, in which, like reference numerals refer to corresponding parts throughout the several views of the drawings.

FIG. 3A is a schematic screen shot of a web browser presenting search responses according to the prior art.

DESCRIPTION OF EMBODIMENTS

Figure 1:
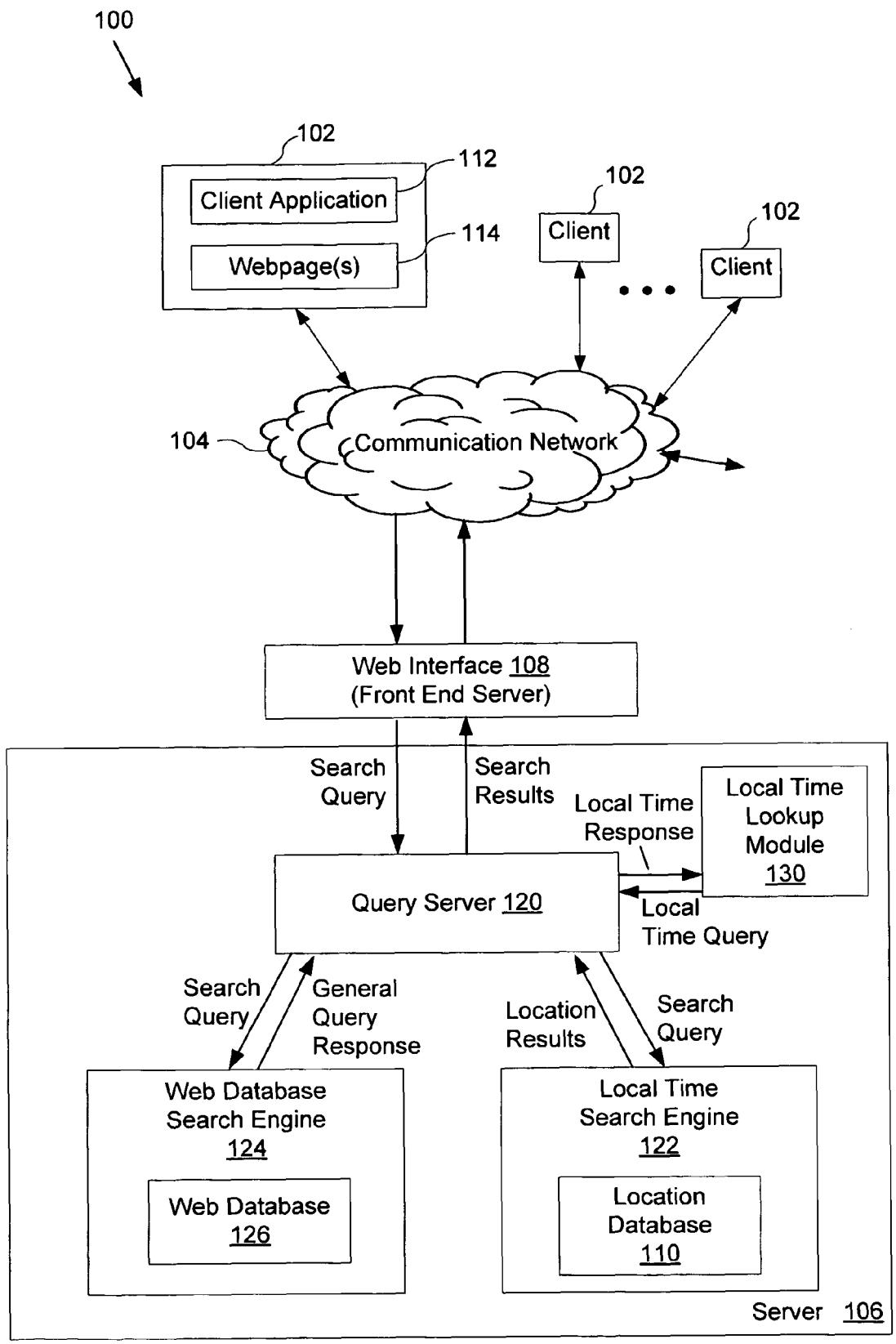
FIG. 1 is a block diagram of a system for implementing some embodiments of the present invention.

FIG. 1 is a block diagram of a system 100 for implementing some embodiments of the present invention. One or more client computers or devices 102 (hereinafter "clients") and a server 106 are connected to a communication network 104.

The server 106 (also sometimes called a search engine system or cluster) may include a query server 120 (sometimes called the "web server"), a web database search engine 124 and a local time search engine 122. In some embodiments, the web database search engine 124 is also known as a primary search engine and the local time search engine 122 is also known as a secondary search engine.

A web interface (also called the "front end server") 108 facilitates communication between the server 106 and the communication network 104. The web interface 108 allows for the transfer of information from the server 106 to the communication network 104 to be displayed on a client application 112 of a client 102. The web database search engine 124 receives search queries from the query server 120 and sends web results to the query server 120. In some embodiments, there are multiple query servers 120 and search engine servers 106 (only one is shown in FIG. 1), and it is the job of the front end server (web interface) 108 to direct incoming queries to one query servers 120.

The web database search engine 124 includes a web database 126 (sometimes herein called an Internet database), which stores information associated with information available on the World Wide Web. The local time search engine 122 also receives search queries from the query server 120 and sends location results (if any) to the query server 120. The local time search engine 122 includes a location database 110, which stores information associated with the time zones in various locations. The location database 110 may be known as a secondary database. A local time look up module 130 contains information about the current time in various time zones. In some embodiments, the query server 120 accesses the local time lookup module 130 to obtain current time information for each location in a result list, as discussed in more detail below. In other embodiments, the local time search engine 122 accesses the local time lookup module 130.

The client 102 may be any of a number of devices (e.g., a computer, an internet kiosk, a personal digital assistant, a cell phone, a desktop computer, or a laptop computer) and can include a client application 112 that permits a user to view web pages 114 or other documents or information. The client application 112 may be a software application that permits a user to interact with the client 102 and/or network resources to perform one or more tasks. For example, the client application 112 may be a web browser (e.g., Firefox, Internet Explorer or Safari) or other type of application that permits a user to search for, browse, and/or use resources, such as one or more web pages 114, on the client 102 and/or accessible via the communication network 104.

The communication network 104 may be a local area network (LAN), a metropolitan area network, a wide area network (WAN), such as an intranet, an extranet, or the Internet, or any combination of such networks. It is sufficient that the communication network 104 provides communication capability between the clients 102 and the server 106. In some embodiments, the communication network 104 uses Hyper-Text Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, or a computational object.

Figure 2A:
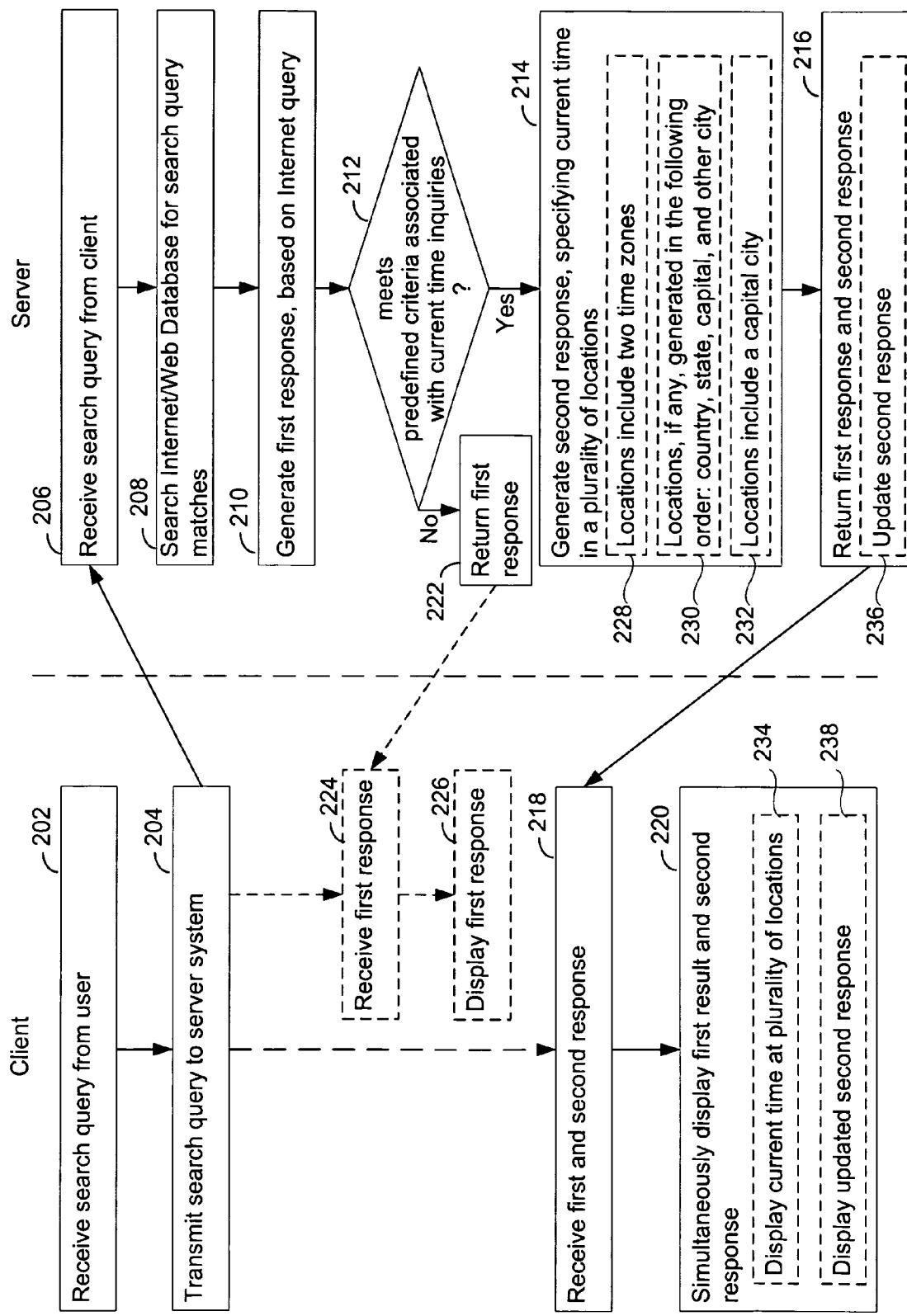
FIGS. 2A and 2B are flowcharts of client and server processes in accordance with some embodiments.

FIG. 2A is a flowchart of client and server information inquiry processing in accordance with some embodiments in which some received queries are construed to be a request for a current time in a specified location. As described in more detail below, the server operations shown in FIG. 2A may be performed by multiple interconnected servers, and may be performed in a different order from the order shown in FIG. 2A. At a client system or device, search query from a user is received (202). The search query is transmitted (204) to a search engine server system. The server system receives (206) the search query from the client system or device. An Internet database is searched (208) to identify a set of documents accessible via the Internet that match the search query. A first response (also known general query response) having information identifying at least a portion of the identified set of documents is generated (210).

A determination (212) is made as to whether the search query meets predefined criteria associated with current time inquiries. In some embodiments, the predefined criteria include first criteria and second criteria. The first criteria is that the search query have any of a first set of predefined current time query formats, such as: what is the time, what's the time, what is the current time, what's the current time, what is the local time, what's the local time, what time is it, what time, and time. In some embodiments, the queries by be followed by a question mark. The second criteria is that the search query also specifies a geographic location such as a country, state, city, municipality, territory, kingdom, district, federation, continent, zip code, etc. In some embodiments, if the geographic location specified matches at least one geographic location on a predefined whitelist, a second response (also known as the local time response) is generated (214) specifying a current time in a plurality of locations. The response may contain the current time for two or more locations because, for example, the specified location (e.g., "Paris") is ambiguous, or because the specified location (e.g., "USA" or "Russia") encompasses two or more time zones. In some embodiments, the second response generated (214) includes locations in at least two distinct time zones. The first response and second response are returned (216) to the client system or device for simultaneous display at the client system or device.

In some embodiments, the first criteria, which requires the search query match any of a first set of predefined current time query formats, is defined by two regular expressions (if a search query matches either regular expression, the first criteria are satisfied), such as the regular expressions shown in Table 1.

TABLE 1

RegularExpression1:
(optional: what is OR what's OR what)
(optional: the)
(required: local current time OR current local time OR current time OR local time OR current localtime OR localtime OR time)
(optional: is it)
(optional: at OR in)
(required: last item in query must be a location matching any white list entry)
(optional: ?)
RegularExpression2:
(required: first item in query must be a location matching any white list entry)
(required: local current time OR current local time OR current time OR local time OR current localtime OR localtime OR time)

In some embodiments, if a user's query includes the predefined criteria, (e.g., "current time") but also includes terms that are negatively associated with current time inquiries (e.g., "computation," "building," "shipment," and so on), the second response is not returned.

The client system or device receives the first and second response (218) from the search engine server system. As stated above, the first response has information identifying a set of documents accessible via the Internet that match the search query, and the second response specifies a current time in a plurality of locations. The client system or device simultaneously displays the first and second responses (220) to the user.

If the search query is determined not to meet the predefined criteria associated with current time inquiries described above (212-No), the only first response is returned (222) to the client system or device. The client system or device receives the first response (224). The client system or device displays the first response (226), which as stated above, has information identifying a set of documents accessible via the Internet that match the search query.

Figure 3B:
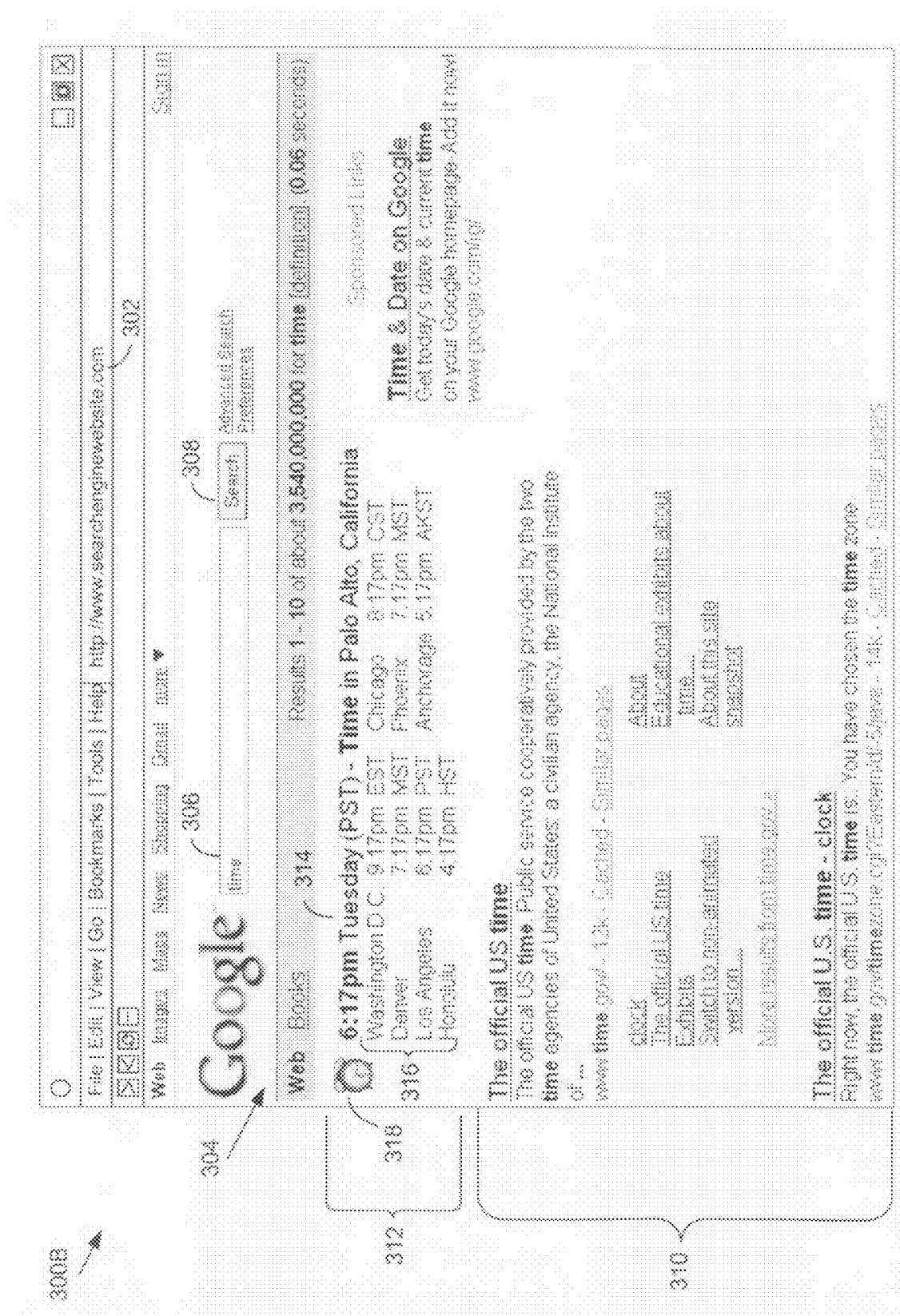
FIGS. 3B-3H are schematic screenshots of a web browser presenting search responses according to some embodiments of the present invention.
Figure 3C:
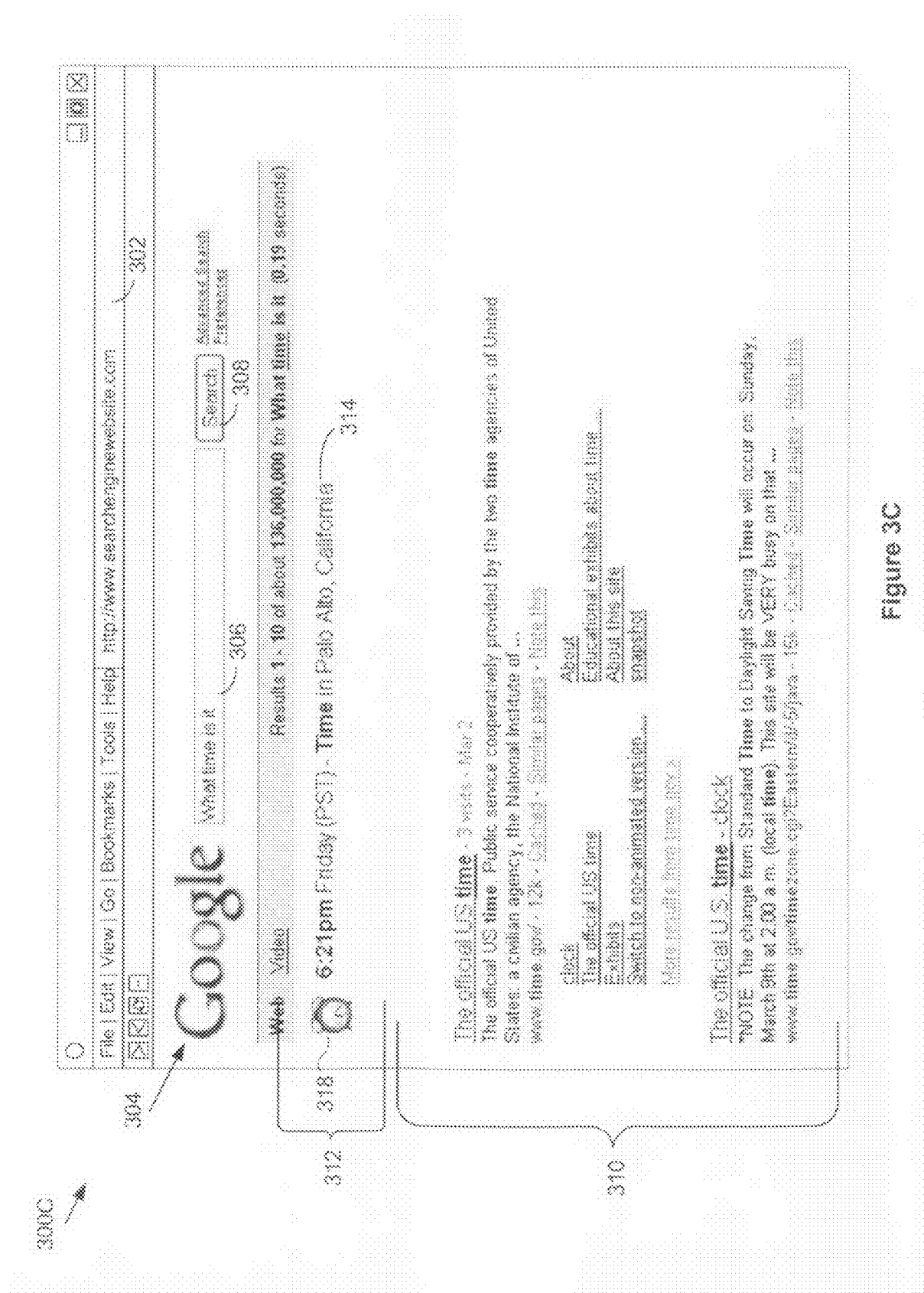

In some embodiments, the plurality of locations generated (214) may be due to more than one geographic location having the same name. For example, if the query, "What time is it in London" is received (202), in some embodiments, the second response generated 314 will include all of the cities with the name "London" which match a city listed on the whitelist. For example, the response may include the time in London, United Kingdom, London, Ontario, and London, Arkansas as shown in FIG. 3F. In some embodiments, if the search query specifies a location name corresponding to a plurality of geographic locations, the second response generated (214) specifies a current time at two or more of the geographic locations. In some embodiments, if the search query specifies a location name corresponding to a plurality of geographic locations in different time zones, the second response generated (214) specifies a current time at two or more of the geographic locations in different time zones (228).

The locations having the same name need not be of the same type. For example, if the query "What time is it in Georgia?" is received (202), the second response generated (214) includes the time in the Republic of Georgia, a country, as well as the time in the state of Georgia located in the United States of America, as shown in FIG. 3G. In some embodiments, in cases where the plurality of geographic locations include at least two of the following types: a country location, a state location, a capital city location and one or more city locations that are not capital city locations, and the second response generated (214) specifies the current time at each of the two or more geographic locations in the following order: the country location if any, the state location if any, the capital city location if any, and the one or more city locations if any (230).

In some embodiments, the plurality of locations in the second response generated (214) may be due to the geographic location specified in the query having a plurality of different time zones. For example, if a large country is specified, the country may include a plurality of different time zones. In such a case, the second response generated (214) specifies the current time in at least one location in each of the different time zones of the specified geographic region (228). Furthermore, in some embodiments, in which the geographic location contains a plurality of different time zones, the second response generated (214) specifies the current time in a capital city corresponding to the geographic location and the current time in at least one time zone other than the time zone in which the capital city is located (232). For example, if the query, "Time Indiana" is received (202), the second response generated (214) includes the time in Indianapolis, the state capital, as well as Evansville, a city in a time zone other than Indianapolis as shown in FIG. 3E.

It should be noted that time zones are often set by political entities (e.g., countries, states, provinces, municipalities, or other venues) rather than strictly by a latitude location. For example, China is on one time zone even though it is very large. Furthermore, some venues may choose to follow daylight saving time while others do not. For this reason, in some embodiments, each geographic location that has a unique time zone, i.e., a unique set of timing rules, is returned when a geographic location specified in the query has a plurality of different time zones. This is the case even when two or more results may currently have identical times. For example, if the query, "Time USA" is received (202), the second response generated (214) includes the time in Washington D.C., Chicago, Denver, Phoenix, Los Angeles, Anchorage, and Honolulu as shown in FIG. 3C. Because Phoenix currently (circa 2008) does not follow daylights savings time, the time listed will sometimes match Denver and sometimes match Los Angeles. Because Phoenix follows a unique set of timing rules, its time is returned even though the actual time is a repeat of another time listed in the results. In the situations mentioned above, the client displays the current time at the specified plurality of locations (234). Each of the aforementioned unique time zones has a corresponding unique time zone identifier that is recognized by the local time lookup service or module 130. For each location whose name is stored in the location database 110, the location database 110 also stores the corresponding time zone identifier.

In some embodiments, after a predetermined amount of time has passed, for example one minute or five minutes, the second response is updated (236). When the second response is updated (236) at the server system, the updated second response is also displayed (238) at the client system or device.

Referring to both FIG. 1 and FIG. 2A, in some embodiments the server operations shown in FIG. 2A are performed in a different order than shown in FIG. 2A in order to enable parallel operation by multiple interconnected servers. In particular, in the embodiment shown in FIG. 1, after the search query is received (206) at the web interface 108, the query is passed to a query server 120, which in turn sends the search query to both a primary (e.g., web or Internet database) search engine 124 and a secondary (local time) search engine 122. The two search engines 122, 124 process the search query in parallel. Although not shown, additional search engines may also process the same search query in parallel as well. Server operations 208 and 210 (search Internet database, generate Internet/web search results, FIG. 2A) are performed by the primary search engine 124. Server operation 212 is performed by the local time search engine 122, and server operation 214 is performed at least in part by the local time search engine 122 (as explained in more detail, next). Both search engines 122, 124 return their results to the query server 120, which in turn passes the results to the web interface 108.

If search query does not match the criteria required by the local time search engine 122 (212-No), the local time search engine 122 returns a null result to the query server 120. On the other hand, if the search query does match the criteria required by the local time search engine 122 (212-Yes), the local time search engine 122 returns a "second response" that comprises a list of location names and time zone identifiers. In other words, in some embodiments the second response (as returned by the local time search engine 122) does not yet include local time values at this point in the process. Instead, if the second response is not null, the query server 120 accesses a local time lookup service or module 130 to obtain the current local time for each location listed in the search result. In particular, the second response includes a time zone identifier for each listed location, and the local time lookup service or module 130 generates current time values for those time zone identifiers. Each distinct time zone identifier corresponds to a unique time zone (see discussion above concerning time zones). The query server 120 then formats the second response, including (for example) adding an analog clock image showing the current time at the first location in the second result, using a larger font for the first location name its local time value than the other location names and their local time values in the second result, and so on. The second response is then inserted into the same search result web page as the first response, received from the primary search engine 124, and the resulting web page, with both sets of search responses is returned to the requesting client. In other embodiments, the local time lookup and formatting of the second response is handled by the local time search engine 122.

Figure 2B:
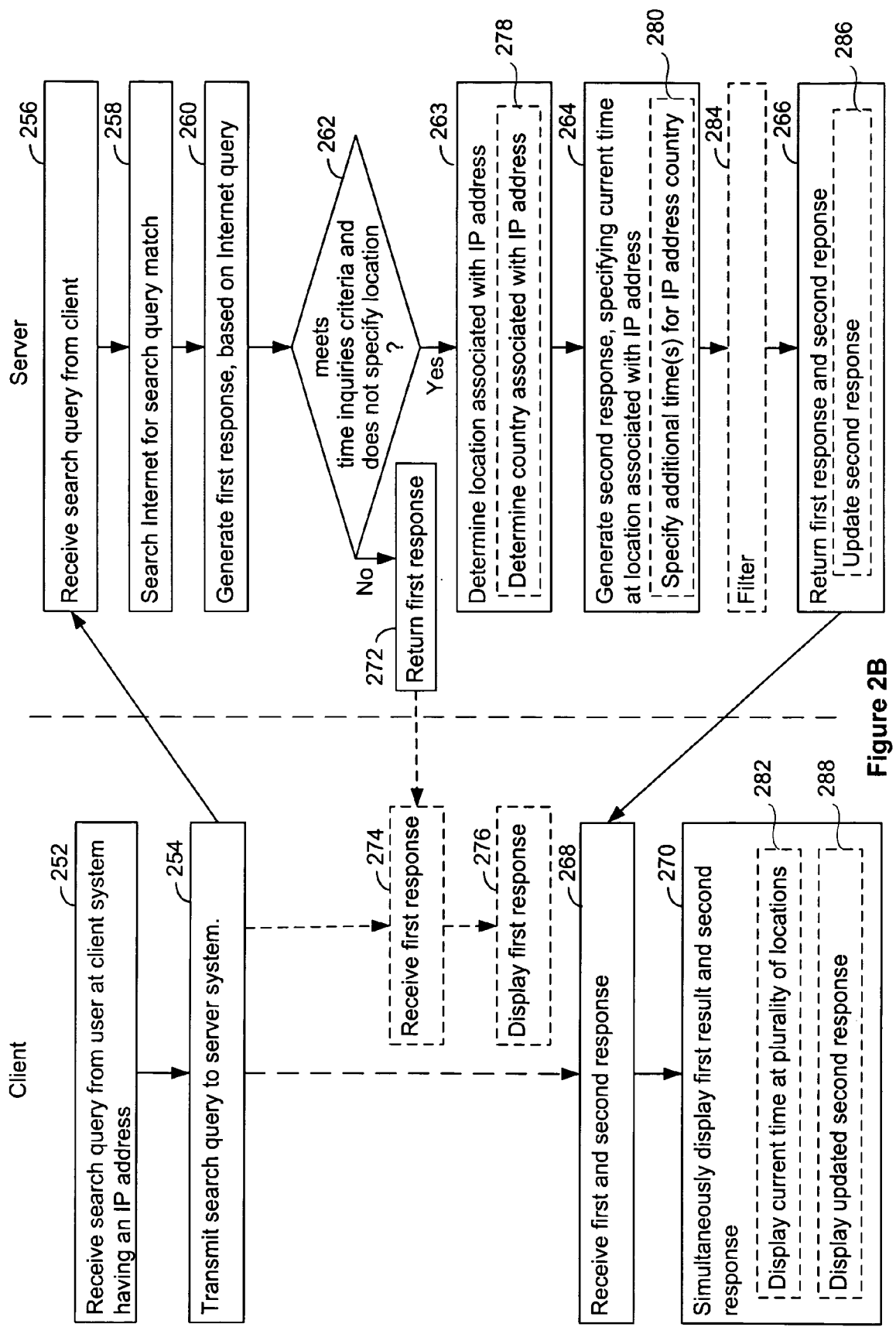

FIG. 2B is a flowchart of client and server information inquiry processing in accordance with some embodiments in which some received queries are construed to be a request for a current time at a user's location, which is not specified in the query. As described in more detail above, the server operations shown in FIG. 2B may be performed by multiple interconnected servers, and may be performed in a different order from the order shown in FIG. 2B. At a client system or device having an IP address, a search query from a user is received (252). The search query is transmitted (254) to a search engine server system. The server system receives (256) the search query from the client system or device. An Internet database is searched (258) to identify a set of documents accessible via the Internet that match the search query. A first response having information identifying at least a portion of the identified set of documents is generated (260).

A determination (262) is made as to whether the search query meets predefined criteria (e.g., third criteria) associated with current time inquiries and does not specify a location. In some embodiments, the predefined criteria (which may be called third criteria) is that the search query have any of a second set of predefined current time query formats, such as: what is the time, what's the time, what is the current time, what's the current time, what is the local time, what's the local time, what time is it, what time, and time. In some embodiments, the queries by be followed by a question mark. Furthermore, the first and second sets of predefined current time query formats may be different, but partially overlapping. Alternately, the first and second sets of predefined current time query formats may be the same, except that the query formats in the second set do not include a location name.

In some embodiments, the third criteria, which requires that the search query have any of a second set of predefined current time query formats, is defined by a regular expression, such as the expression (RegularExpression3) shown in Table 2.

TABLE 2

RegularExpression3:
(optional: what is OR what's OR what)
(optional: the)
(required: local current time OR current local time OR current time OR local time OR current localtime OR localtime OR time)
(optional: is it)
(optional: ?)

If the search query is determined to meet the predefined criteria associated with current time inquiries and if the search query does not specify a location, the location associated with the IP address of the client system or device is determined (263). A second response specifying a current time at the location associated with the IP address of the client system or device is generated (264). The first response and second response are returned to the client system or device (266) for simultaneous display at the client system or device.

The client system or device receives the first and second response (268) from the search engine server system. As stated above, the first response comprises information identifying a set of documents accessible via the Internet that match the search query, and the second response specifies a current time at the location associated with the IP address of the client system or device. The client system or device simultaneously displays the first and second responses (270) to the user.

If the search query is determined not to meet the predefined criteria associated with current time inquiries described above, the first response is returned to the client system or device (272). The client system or device receives the first response (274). The client system or device displays (276) the first response, which as stated above, has information identifying a set of documents accessible via the Internet that match the search query. In some embodiments, when the search query does not meet the predefined criteria, the second response is not generated or a null second response is generated.

In some embodiments, a country associated with the location associated with the IP address of the client system or device is also determined (278). The current time associated with one or more locations within the country associated with the IP address is specified (280) as a part of the second response. If there is only one time for the country associated with the IP address only one result is returned in the second response. In some embodiments, the one result returned in the second response may list the city and the country location, while in other embodiments it may list only the country location. When there is a plurality of locations associated with the country associated with the IP address, the client system or device displays (282) the current time at the plurality of locations associated with the country associated with the IP address.

In some embodiments, when at least two locations within the country associated with the IP address are specified (280), the second response is filtered (284). In some embodiments, the second response is filtered (284) to remove one or more locations within the country having the same time as the current time at the location associated with the IP address of the client system or device. In other embodiments, the second response is filtered (284) to remove a duplicate location from the second response.

In some embodiments, after a predetermined amount of time has passed, for example one minute or five minutes, the second response is updated (286). When the second response is updated (286) at the server system, the updated second response is also displayed (288) at the client system or device.

In some embodiments, the second responses (214), (263) associated with the methods of FIG. 2A and FIG. 2B have additional aspects. For example, in some embodiments, when there is a plurality of locations is displayed (234), (282), a first local time result (see for example, 314, FIG. 3B) is displayed in a first location of the plurality of locations, and one or more second local time results (see for example, 316, FIG. 3B) is displayed in a second location of the plurality of locations. In some embodiments, the first local time result 314 may be located above the second local time results 316. In some embodiments, the first local time result 314 is the capital of the country or state requested in the query. In some embodiments, where no location is specified, the first local time result 314 is the location associated most closely with the IP address of the client system or device, while the second local time results 316 include one or more other locations within the country associated with the IP address of the client system or device. In some embodiments, a location known to be of the most interest to a large group of users may be listed as the first result 314. For example, as shown in FIG. 3H, if the query, "Time Washington" is received (202), the second response generated (214) includes "Washington D.C., District of Columbia" as the first local time result 314 and "Washington, United Kingdom" and "Washington, United States of America" as second local time results 316.

In some embodiments, the first local time result 314 is formatted for display in a visually distinctive manner relative to formatting of a second local time result 316. For example, as shown in FIG. 3B, the first local time result 314 is shown in larger font and in bold as compared to the other local time results. In some embodiments, the visually distinctive manner is any one or more of the following: bolding, larger font, different font type, highlighting, underlining, all capitalization, text coloration, active linking, blinking, being circled or put inside a box.

In some embodiments, an analog clock (See 318, FIG. 3B) having hands indicating the current time of the first location and text having a digital representation of the current time of the first location is also displayed. In some embodiments, the analog clock 318 is formatted to visually indicate a.m. and p.m. or daytime and night time. For example, in some embodiments, the analog clock 318 is colored yellow to represent a.m. and is colored gray to represent p.m. In some embodiments, other colors are used. In some embodiments, shading rather than coloring is used. In some embodiments, more than two colors are used. For example, in some embodiments, a different color is used for normal work hours, evening hours, morning hours, and sleeping hours. In some embodiments, for locations that practice siesta, the normal siesta time is shown by a unique color or shading of the analog clock 318 as well.

FIG. 3A is a schematic screenshot of a prior-art web browser presenting search results. As seen in this figure, a general query is entered into the search field (301) and general search results corresponding to the search query (303) are displayed.

FIGS. 3B-3H are schematic screenshots of a web browser presenting search results according to some embodiments of the present invention. FIG. 3B is a schematic screenshot 300B of the display (i.e., user interface) produced by a web browser presenting search results according to one embodiment of the present invention. In FIG. 3B an example of results for the query "time" is shown. The user interface 300B can be produced by any type of browser (e.g., a web browser) that permits a user to display and interact with web pages or other documents or information. The user interface 300B includes a URL field 302 for entering the URL of any web page that a user wants to display, as well as for displaying the URL of the web page currently being displayed. As illustrated in this figure, the user interface 300A displays an exemplary web page 304. Web page 304 includes a search field 306 with a corresponding search button 308 for initiating a search for information corresponding to the search query in the search field 306.

When a user enters a search query in the search field 306 and selects the corresponding search button 308 to initiate a search, the web browser (i.e., the user interface 300A of the web browser) sends the search query to a search engine or server, and receives and displays a webpage with results returned by the search engine or server. In this example, the web browser presents first response 310 (also known general query response) and second response 312 (also known as time response). In some embodiments, the second response 312 includes a first local time result 314 and one or more second local time results 316. In some embodiments, the first local time result 314 is formatted for display in a visually distinctive manner relative to formatting of the one or more second local time results 316. In some embodiments, an analog clock 318 having hands indicating the current time of the first result 314 is also displayed. The analog clock 318 may appear in various colors or shades to represent a.m. and p.m. or the evening or morning. In other embodiments, additional analog clocks 318 may appear to represent the time in each second result 316 as well.

As shown in FIG. 3B, the first local time response 310 and second local time response 312 are simultaneously displayed on a client application (i.e., web page 304) of the client device. In some embodiments, the second response 312 is presented in a continuous subregion (sometimes called a "OneBox" or "One Box") of a single web browser window. In other embodiments, the second response 312 is presented in a manner that is visually distinguishable from the general query response 310. For example, in some embodiments, the first response 310 and second response 312 are displayed in a list, and the second response 312 is displayed above the first response 310 on the list. In some embodiments, the first response 310 is displayed in a second region of the web browser window that excludes the contiguous sub-region of the web browser window in which the second response 312 is displayed.

FIG. 3C shows an example of the results for the query "What time is it?" FIG. 3C is a schematic screenshot 300C of the display (i.e., user interface) produced by a web browser presenting search results according to one embodiment of the present invention. In this example, only the current time associated with the specific location of the IP address of the client system or device is displayed as a first result 314.

Figure 3D:
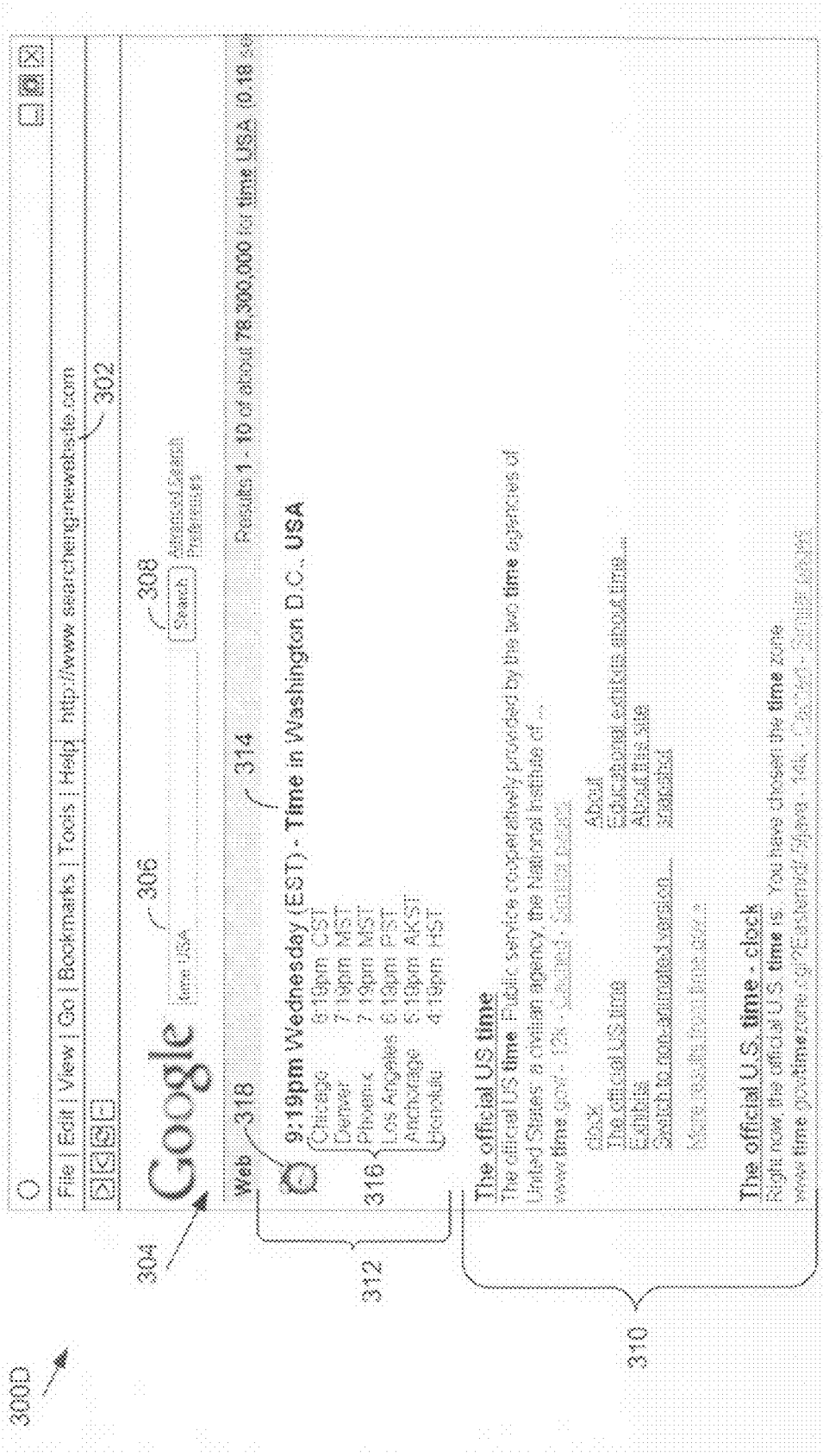
Figure 3E:
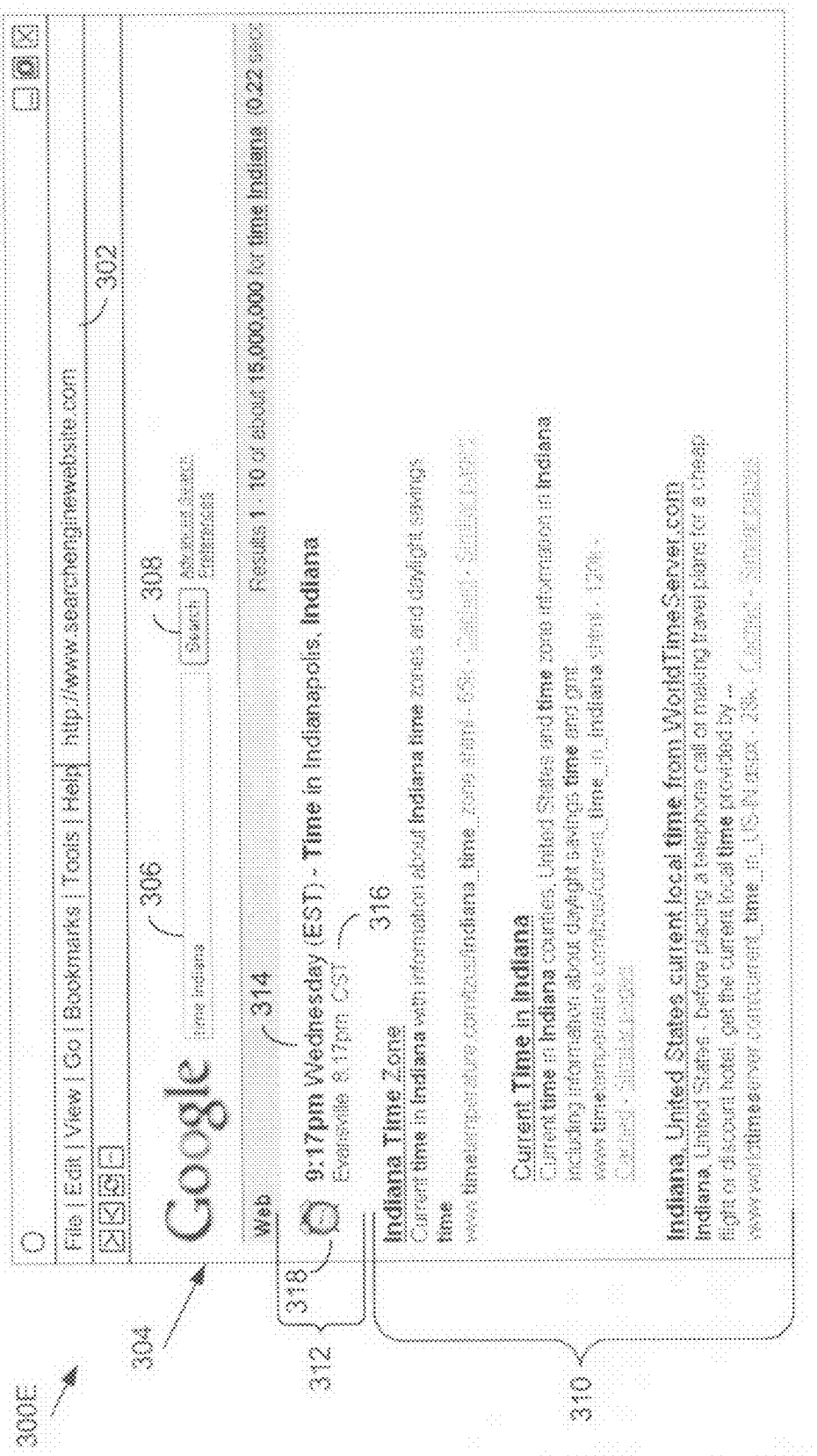
Figure 3F:
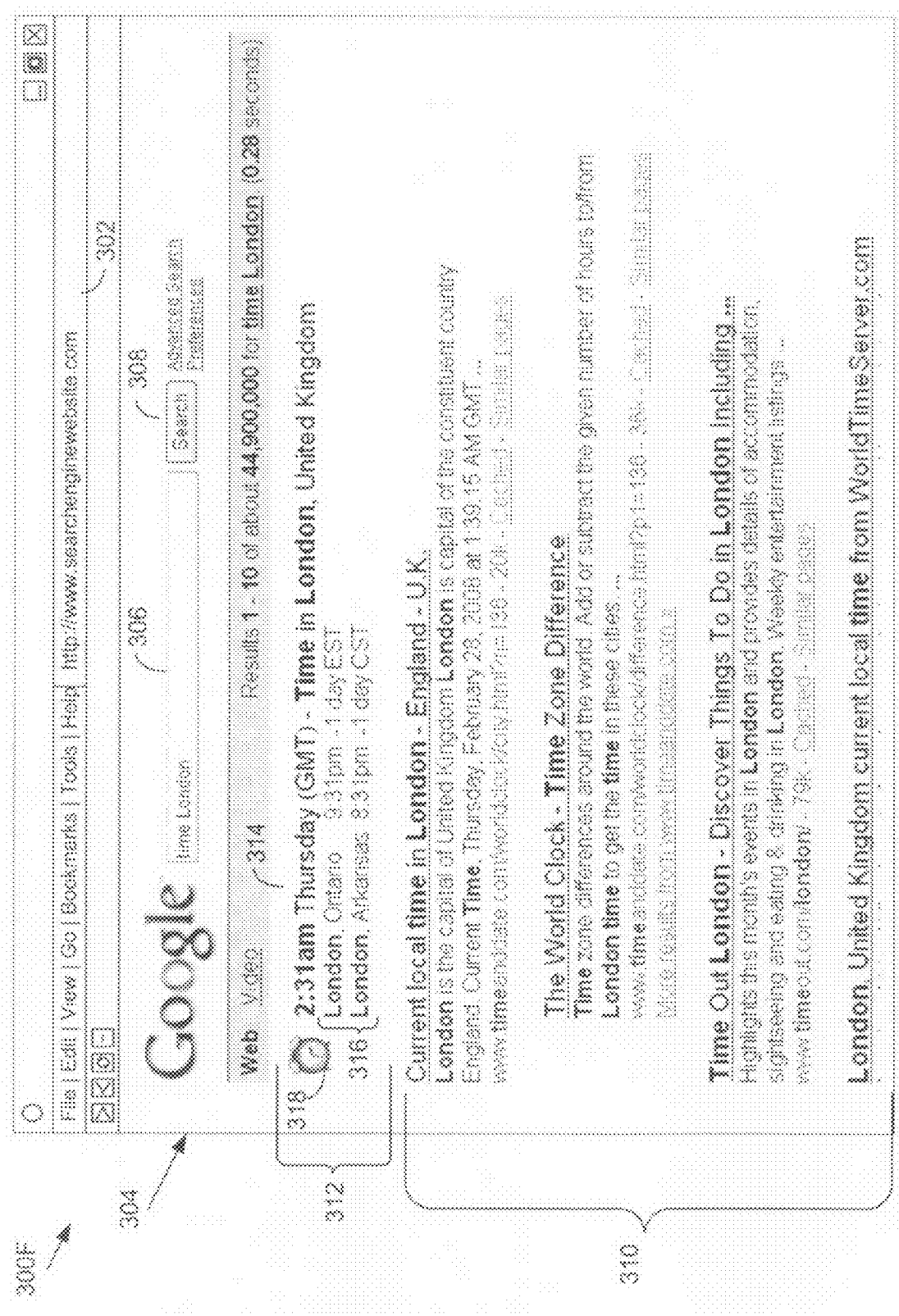
Figure 3G:
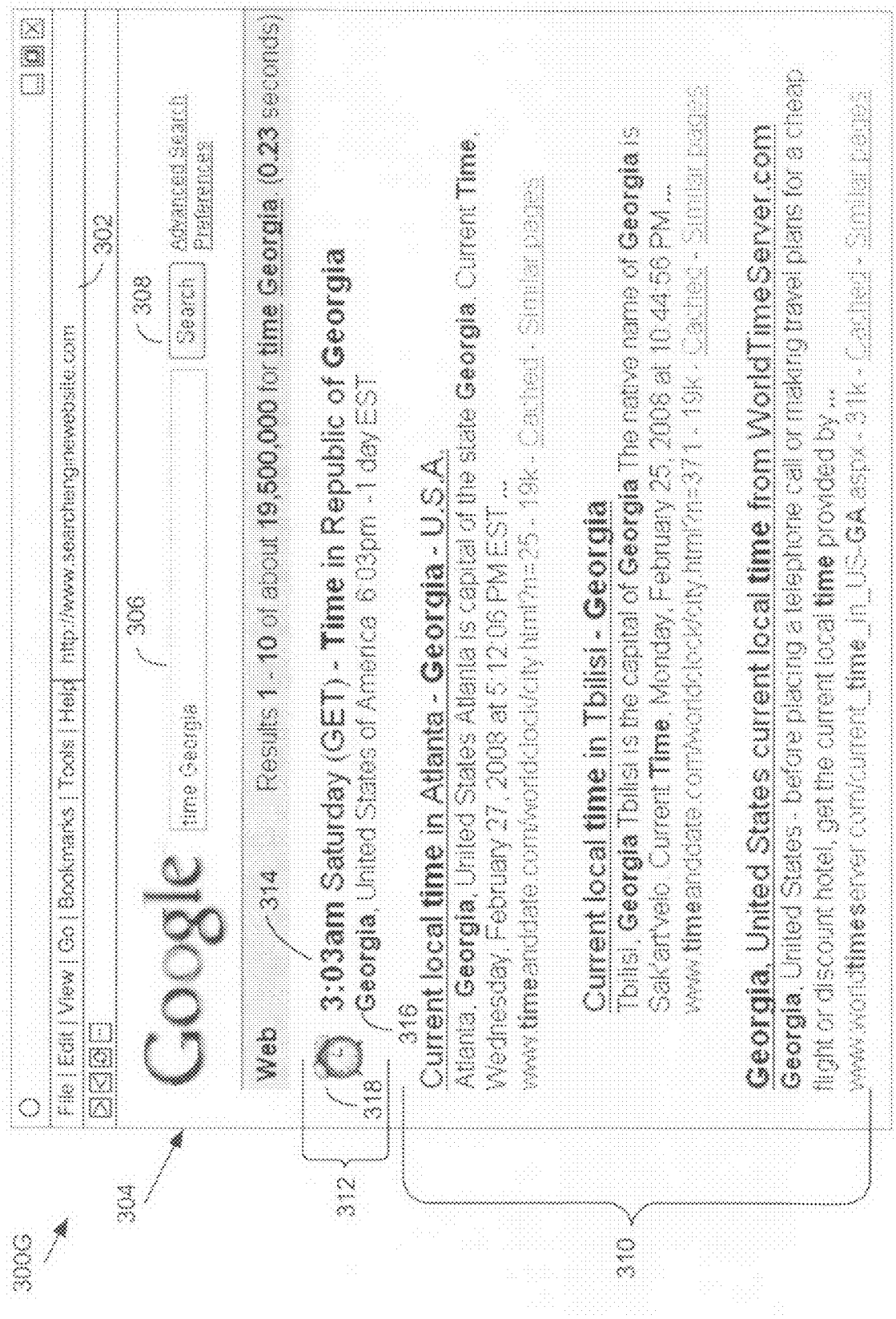
Figure 3H:
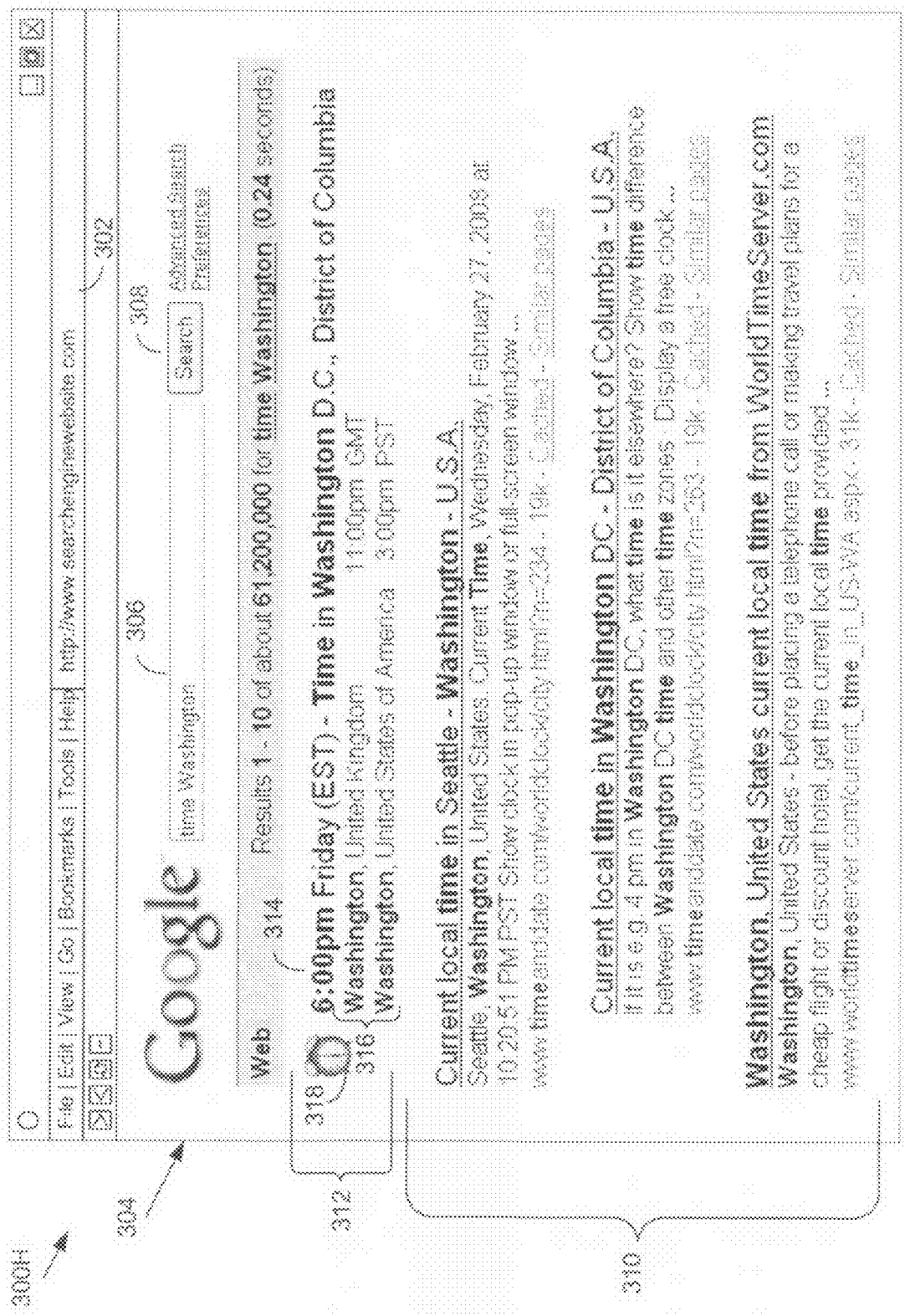

In FIG. 3D, an example of the results for the query "time USA" is shown. FIG. 3D is a schematic screenshot 300D of the display (i.e., user interface) produced by a web browser presenting search results according to one embodiment of the present invention. As the USA (United States of America) has multiple time zones, the second response 312 includes a first result 314 and several second results 316. In some embodiments, when a country with multiple time zones is specified in the query, the first result 314 listed is the capital of the country. An example of this is shown in FIG. 3D, where "Washington D.C., USA" is listed as the first result 314.

FIG. 3E shows an example of the results for the query "time Indiana." FIG. 3E is a schematic screenshot 300E of the display (i.e., user interface) produced by a web browser presenting search results according to one embodiment of the present invention. As the Indiana has two time zones, the second response 312 includes a first result 314 and a second result 316. In some embodiments, when a state with multiple time zones is specified in the query, the first result 314 listed is the capital of the state. An example of this is shown in FIG. 3E, where "Indianapolis, Ind." is listed as the first result 314.

FIG. 3F shows an example of the results for the query "time London." FIG. 3F is a schematic screenshot 300F of the display (i.e., user interface) produced by a web browser presenting search results according to one embodiment of the present invention. In this example, a plurality of locations for the second response is due to more than one geographic location having the name "London." In some embodiments, when more than one geographic location is listed and one of the results is a capital city, the capital city is listed as the first result 314. An example of this is shown in FIG. 3F, because London is the capital of the United Kingdom. In some embodiments, when more than one geographic location is listed, the geographic location with the highest population is listed as the first result 314. In some embodiments, when more than one geographic location is listed, the geographic location with the earliest time is listed as the first result 314. In yet other embodiments, when more than one geographic location is listed, the geographic locations are alphabetically ordered.

In FIG. 3G, an example of the results for the query "time Georgia" is shown. FIG. 3G is a schematic screenshot 300G of the display (i.e., user interface) produced by a web browser presenting search results according to one embodiment of the present invention. In this example, a plurality of locations for the second response is due to more than one geographic location having the name "Georgia." In some embodiments, when more than one geographic location is listed and one of the results is a country, the country is listed first. An example of this is shown in FIG. 3G, where the "Republic of Georgia" is listed as the first result 314 and the state, "Georgia, United States of America" is listed as the second result 316. In some embodiments, the results in the second response are ordered as follows: country location if any, the state location if any, the capital city location if any, and the one or more city locations if any. FIG. 3G is an example following this order.

In FIG. 3H, an example of the results for the query "time Washington" is shown. FIG. 3H is a schematic screenshot 300H of the display (i.e., user interface) produced by a web browser presenting search results according to one embodiment of the present invention. In this example, a plurality of locations for the second response is due to more than one geographic location having the name "Washington." In some embodiments, a location known to be of the most interest to a large group of users may be listed as the first result 314. For example, as shown in FIG. 3H, the second response generated (214) includes "Washington D.C., District of Columbia" as the first result 314. Then "Washington, United Kingdom" and "Washington, United States of America" are listed as second results 316.

Figure 4A:
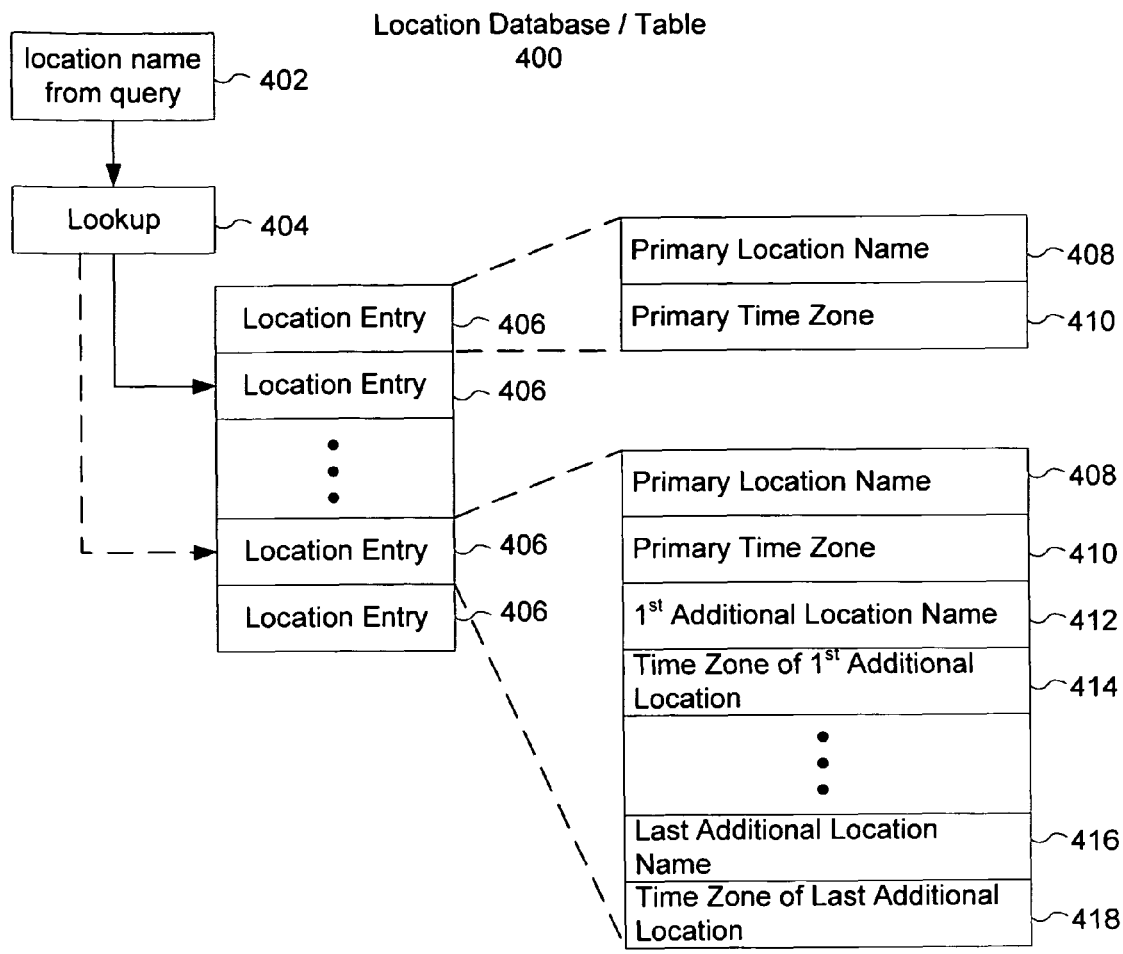
FIGS. 4A and 4B are block diagrams of data structures used in some embodiments.
Figure 4B:
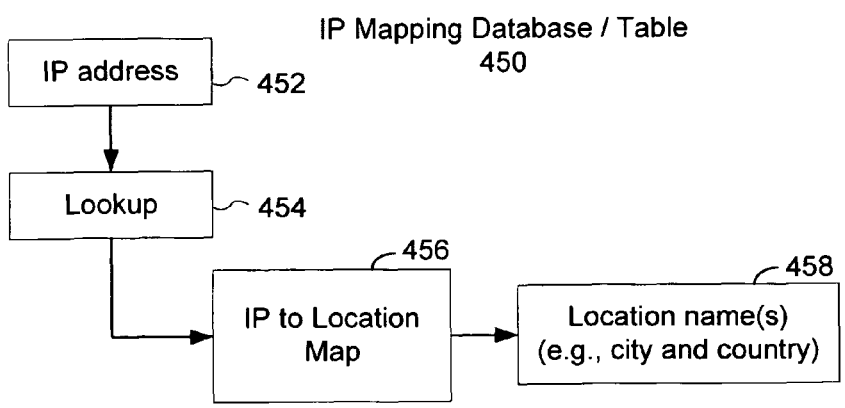

FIGS. 4A and 4B are block diagrams of data structures used in some embodiments. FIG. 4A shows an embodiment of a location database or table 400, which may be used as the location database 110 in the system shown in FIG. 1. In some embodiments, the location database/table 400 contains a subset or a superset of the elements depicted in FIG. 4A. The location database/table 400 includes a plurality of location entries 406. Each location entry 406 contains a primary location name 408 and a primary time zone 410. In some embodiments, some of the location entries 406 contain information for one or more additional location names. Thus, a respective location entry 406 may contain a first additional location name 412 and time zone of a first additional location 414. Alternately, a respective location entry may contain a plurality of additional location names and time zones, from a first additional location name 412 and time zone of a first additional location 414 to a last additional location name 416 and time zone of a last additional location 418.

To find the entry in the location database/table 400 for a particular location name 402, a lookup operation 404 is performed. The location name may be specified in the search query received from the client, or it may be received from the IP mapping database/table (see 450, FIG. 4B). The lookup operation 404 may be performed using an index or other table lookup mechanism.

Each location entry 406 is, in essence, a pre-computed set of location results for a local time search query. Furthermore, the location entries 406 are stored in the location database/table 400 in ranked order, with higher ranked or more important entries closer to the top or beginning of the location database/table 400 than lower ranked or less important entries. As a result, the search for a matching entry (matching a location name in a search query) can stop when the highest ranked match is found. When a matching entry 406 is found, all the (location name, time zone) pairs in that entry are returned as the result.

In some embodiments, multiple location names and time zones exist for a location entry 406 because the name of the location corresponds to more than one geographical location, such as London, or San Jose for example. In some embodiments, multiple location names exist for a location entry 406 because the location specified has multiple time zones within it such as the USA or Indiana. In some embodiments, in cases where multiple time zones exist for a specified location name (in a search query), at least one location is listed for each time zone of the multiple time zones. In some embodiments, a separate location entry 406 exists in the location database/table 400 for each equivalent name of a location. For example, in some embodiments, the entries United States of America, USA, United States, and US each has a separate location entry 406 in the location database/table 400. All of these location entries 406 are the same (contain the same set of locations and time zones), except for the primary location name. In other embodiments, the equivalent names are contained in the same location entry 406.

FIG. 4B shows a IP mapping database/table 450. In some embodiments, the IP mapping database/table 450 contains a subset or a superset of the elements depicted in FIG. 4B. The IP mapping database/table 450 receives an IP address 452 for a client system or device. A lookup 454 is performed in an IP to Location Map 456, and a location name 458 is returned from the IP to Location Map 456. In some embodiments, both a city location name and a country location name 458 are returned by the IP to Location Map 456. As such, the geographic location associated with the IP address is determined. This geographic location is then looked up in the location database/table 400 described in FIG. 4A to get one more pairs of location name (408) and time zone (410) that match the IP address 452 of the client system or device.

It should be noted that IP addresses are relatively good indicators of the relative geographic location of a client system or device, but are not perfect at predicting the particular city or even state where the client system or device resides. However, the country associated with the IP address 452 can be predicted to a high level of certainty. Therefore, in some embodiments, it is useful to return both a city and a country associated with the IP address 452. Then, as described above, both the local time associated with the city and the local time(s) associated with the country (including numerous times when appropriate) can be returned in the second response. Returning times for both the city and the country increases the odds that the correct time associated with a user's actual location is returned to the user.

Figure 5:
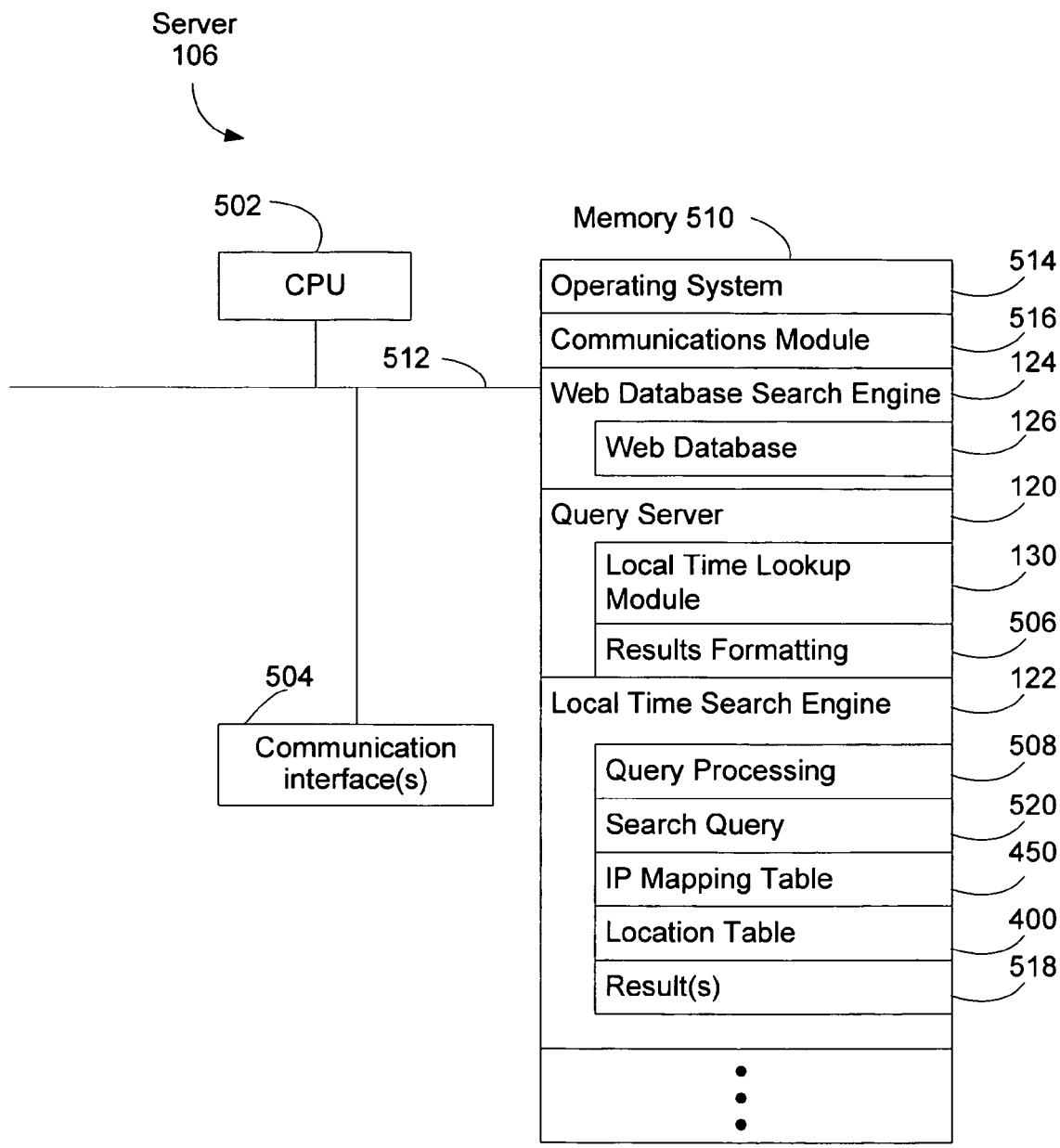
FIG. 5 is a block diagram of a server system in accordance with some embodiments.

FIG. 5 is a block diagram illustrating a server 106 in accordance with one embodiment of the present invention. The server 106 typically includes one or more processing units (CPU's) 502, one or more network or other communications interfaces 504, memory 510, and one or more communication buses 512 for interconnecting these components. The communication buses 512 may include circuitry (sometimes called a chipset) that interconnects and controls communications between system components. Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510, or alternately the non-volatile memory device(s) within memory 510, comprises a computer readable storage medium. In some embodiments, memory 510 stores the following programs, modules and data structures, or a subset thereof:

- an operating system 514 that includes procedures for handling various basic system services and for performing hardware dependent tasks;
- a network communication module 516 that is used for connecting the server 106 to other computers via the one or more communication network interfaces (wired or wireless) and one or more communication networks 104, such as the Internet, other wide area networks, local area networks, metropolitan area networks, and so on;
- an Internet or web database search engine 124 that performs searches for Internet accessible documents in response to a search query, using an Internet or web database 126;
- a query server 120, that communicates with the web database search engine 124 to send the search query and receive the first response (also known general query response) and to communicate with the local time search engine 122 to send the search query and receive the second response (also known as the local time response); in some embodiments, the query server also includes a local time lookup module 130 for obtaining current time information for each location in a result list and a results formatting system 506 for formatting the first response and the second response, including formatting the first result 314 (see FIGS. 3B-3H) and the one or more second results 316 of the second response, and for formatting the analog clock 318; and
- a local time search engine 122 including a query processing module 508 for determining if the query meets predefined criteria associated with current time inquiries; a search query module 520 for generating a second response; an IP mapping table 450 for associating a geographic location with an IP address; a location table 400 for identifying a location entry 406 (FIG. 4A) matching the search query and obtaining the location names 408, 412,416 and time zones 410, 414, 418 in the location entry 406; and a results module 518 for returning the second response to the client 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Although FIG. 5 shows a "server system" 106, FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a server system 106 and how features are allocated among them will vary from one implementation to another, and may depend in part on the amount of data traffic that the system must handle during peak usage periods as well as during average usage periods.

Figure 6:
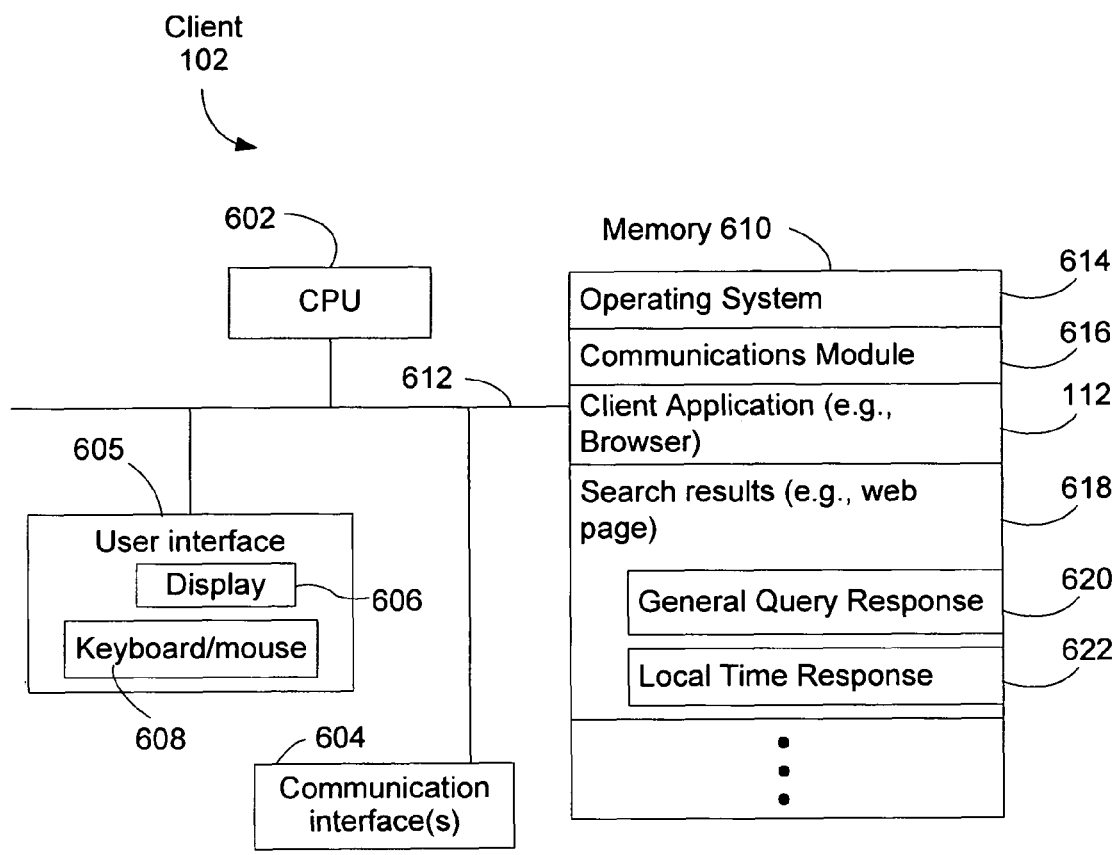
FIG. 6 is a block diagram of a client system or device in accordance with some embodiments.

FIG. 6 is a block diagram illustrating a client 102 in accordance with one embodiment of the present invention. The client 102 typically includes one or more processing units (CPU's) 602, one or more network or other communications interfaces 604, memory 610, and one or more communication buses 612 for interconnecting these components. The communication buses 612 may include circuitry (sometimes called a chipset) that interconnects and controls communications between system components. The client 102 optionally may include a user interface 605 comprising a display device 606 and a keyboard 608. Memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 610 may optionally include one or more storage devices remotely located from the CPU(s) 602. Memory 610, or alternately the non-volatile memory device(s) within memory 610, comprises a computer readable storage medium. In some embodiments, memory 610 stores the following programs, modules and data structures, or a subset thereof:

- an operating system 614 that includes procedures for handling various basic system services and for performing hardware dependent tasks;
- a network communication module 616 that is used for connecting the server 102 to other computers via the one or more communication network interfaces (wired or wireless) and one or more communication networks, such as the Internet, other wide area networks, local area networks, metropolitan area networks, and so on;
- a client application 112 such as a browser for displaying documents such as web pages, and for sending queries to and receiving query responses to an online service, such as a search engine or other information service; and
- search results 618 that contain the first response 620 (also known as the general query response and the second response 622 (also known as the local time response); in some embodiments the search results 618 are included in a web page returned to the client 102 in response to a query.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing information inquiries, comprising:

at a server system:
- receiving a search query from a client system or device;
- searching an Internet database to identify a set of documents accessible via the Internet that match the search query;
- generating a first response comprising information identifying at least a portion of the identified set of documents;
- determining whether the search query meets predefined criteria associated with current time inquiries;
- if the search query is determined to meet the predefined criteria associated with current time inquiries, generating a second response specifying a current time in a plurality of locations, and returning to the client system or device the first response and the second response for simultaneous display at the client system or device; and
- if the search query is determined not to meet the predefined criteria associated with current time inquiries, returning to the client system or device the first response for display at the client system or device.

2. The method of claim 1 wherein generating said second response further comprises: formatting for display a first result, for a first location of the plurality of locations, and in a visually distinctive manner relative to formatting of a second result, for a second location of the plurality of locations.

3. The method of claim 2 wherein generating said second response further comprises: formatting for display the first result to include both an image of an analog clock having hands indicating the current time at the first location and text having a digital representation of the current time at the first location.

4. The method of claim 1 wherein the plurality of locations include locations in at least two distinct time zones.

5. The method of claim 4 wherein generating said second response further comprises: if the search query specifies a geographic location having a plurality of different time zones, generating the second response to specify the current time in at least one location in each of the different time zones of the specified geographic location.

6. The method of claim 4 wherein generating said second response further comprises: if the search query specifies a geographic location having a plurality of different time zones, generating the second response to specify the current time in a capital city corresponding to the geographic location and the current time in at least one time zone other than the time zone in which the capital city is located.

7. The method of claim 1 wherein generating said second response further comprises: if the search query specifies a location name corresponding to a plurality of geographic locations, generating the second response to specify the current time at two or more of the geographic locations.

8. The method of claim 7,
wherein the plurality of geographic locations include at least two of the set consisting of a country location, a state location, a capital city location and one or more city locations that are not capital city locations, and
generating said second response comprises generating the second response to specify the current time at each of the two or more geographic locations in the following order: the country location if any, the state location if any, the capital city location if any, and the one or more city locations if any.

9. The method of claim 1 wherein generating said second response further comprises: if the search query specifies a location name corresponding to a plurality of geographic locations in different time zones, generating the second response to specify the current time at two or more of the geographic locations in different time zones.

10. The method of claim 1 wherein generating said second response further comprises: after a predetermined period of time, updating said second response to comport with a new current time.

11. A method of processing information inquiries, comprising:

at a server system:
- receiving a search query from a client system or device having an IP address;
- searching an Internet database to identify a set of documents accessible via the Internet that match the search query;
- generating a first response comprising information identifying at least a portion of the identified set of documents;
- determining whether the search query meets predefined criteria associated with current time inquiries and does not specify a location;
- if the search query is determined to meet the predefined criteria associated with current time inquiries and if the search query does not specify a location, determining a location associated with the IP address of the client system or device, generating a second response specifying a current time at the location associated with the IP address of the client system or device, and returning to the client system or device the first response and the second response for simultaneous display at the client system or device; and
- if the search query is determined not to meet the predefined criteria associated with current time inquires, returning to the client system or device the first response for display at the client system or device.

12. The method of claim 11, wherein generating said second response further comprises:

- determining a country associated with the location associated with the IP address of the client system or device; and
- generating the second response to additionally specify the current time at one or more locations within the country associated with the IP address.

13. The method of claim 12 further comprising: filtering the second response to remove one or more locations within the country having the same time as the current time at the location associated with the IP address of the client system or device.

14. The method of claim 12 further comprising: filtering the second response to remove a duplicate location from the second response.

15. A method of processing information inquiries, comprising:

at a client system or device:
  receiving a search query from a user, wherein the search query comprises a current time inquiry meeting predefined criteria;
  transmitting the search query to a search engine server system;
  receiving from the search engine server system a first response and a second response, the first response comprising information identifying a set of documents accessible via the Internet that match the search query, and the second response specifying a current time in a plurality of locations; and
  simultaneously displaying the first response and the second response, wherein the second response is formatted for display in a visually distinctive manner relative to formatting of the first response, and wherein, if the search query specifies a geographic location having a plurality of different time zones, the second response includes the current time in at least one location in each of the different time zones of the specified geographic location.

16. The method of claim 15, wherein the second response includes an image of an analog clock having hands indicating the current time at a first location of the plurality of locations and text having a digital representation of the current time at the first location.

17. A method of processing information inquiries, comprising:

at a client system or device having an IP address:
  receiving a search query from a user, wherein the search query comprises a current time inquiry meeting predefined criteria and does not specify a location;
  transmitting the search query to a search engine server system;
  receiving from the search engine server system a first response and a second response, the first response comprising information identifying a set of documents accessible via the Internet that match the search query, and the second response specifying a current time at a location associated with the IP address of the client system or device; and
  simultaneously displaying the first response and second response, wherein the second response is formatted for display in a visually distinctive manner relative to formatting of the first response, and wherein the second response includes an image of an analog clock having hands indicating the current time at the location associated with the IP address of the client system or device and text having a digital representation of the current time at the location.

18. The method of claim 17, wherein the second response includes the current time at a plurality of locations within a country associated with the location associated with the IP address of the client system or device.

19. A server system comprising:
one or more processors;
memory storing one or more programs to be executed by the one or more processors, the one or more programs including:
  instructions for receiving a search query from a client system or device;
  instructions for obtaining a first response comprising information identifying at least a portion of an identified set of documents, accessible via the Internet, that match the search query;
  instructions for determining whether the search query meets predefined criteria associated with current time inquiries;
  instructions, for execution when the search query is determined to meet the predefined criteria associated with current time inquiries, for generating a second response specifying a current time in a plurality of locations, and for returning to the client system or device the first response and the second response for simultaneous display at the client system or device; and
  instructions, for execution when the search query is determined not to meet the predefined criteria associated with current time inquiries, for returning to the client system or device the first response for display at the client system or device.

20. The server system of claim 19, wherein the second response is formatted for display in a visually distinctive manner relative to formatting of the first response.

21. The server system of claim 19, wherein, if the search query specifies a geographic location having a plurality of different time zones, the second response includes the current time in at least one location in each of the different time zones of the specified geographic location.

22. The server system of claim 19, wherein the second response includes an image of an analog clock having hands indicating the current time at a first location of the plurality of locations and text having a digital representation of the current time at the first location.

23. A server system comprising:
one or more processors;
memory storing one or more programs to be executed by the one or more processors, the one or more programs including:
  instructions for receiving a search query from a client system or device having an IP address;
  instructions for obtaining a first response comprising information identifying at least a portion of an identified set of documents, accessible via the Internet, that match the search query;
  instructions for determining whether the search query meets predefined criteria associated with current time inquiries and does not specify a location;
  instructions, for execution when the search query is determined to meet the predefined criteria associated with current time inquiries and the search query does not specify a location, for determining a location associated with the IP address of the client system or device, generating a second response specifying a current time at the location associated with the IP address of the client system or device, and for returning to the client system or device the first response and the second response for simultaneous display at the client system or device; and
  instructions, for execution when the search query is determined not to meet the predefined criteria associated with current time inquires, for returning to the client system or device the first response for display at the client system or device.

24. The server system of claim 23, wherein the second response includes the current time at a plurality of locations within a country associated with the location associated with the IP address of the client system or device.

25. The server system of claim 23, wherein the second response includes an image of an analog clock having hands indicating the current time at the location associated with the IP address of the client system or device and text having a digital representation of the current time at the location.

26. A computer program product for use in conjunction with a computer system, the computer program product comprising a computer readable storage medium and a computer program mechanism embedded therein, the computer program mechanism comprising:

instructions for receiving a search query from a client system or device;

instructions for obtaining a first response comprising information identifying at least a portion of an identified set of documents, accessible via the Internet, that match the search query;

instructions for determining whether the search query meets predefined criteria associated with current time inquiries;

instructions for execution when the search query is determined to meet the predefined criteria associated with current time inquiries, for generating a second response specifying a current time in a plurality of locations, and for returning to the client system or device the first response and the second response for simultaneous display at the client system or device; and instructions for execution when the search query is determined not to meet the predefined criteria associated with current time inquiries, for returning to the client system or device the first response for display at the client system or device.

27. The computer program product of claim 26, wherein the second response is formatted for display in a visually distinctive manner relative to formatting of the first response.

28. The computer program product of claim 26, wherein, if the search query specifies a geographic location having a plurality of different time zones, the second response includes the current time in at least one location in each of the different time zones of the specified geographic location.

29. The computer program product of claim 26, wherein the second response includes an image of an analog clock having hands indicating the current time at a first location of the plurality of locations and text having a digital representation of the current time at the first location.

30. A computer program product for use in conjunction with a computer system, the computer program product comprising a computer readable storage medium and a computer program mechanism embedded therein, the computer program mechanism comprising:

instructions for receiving a search query from a client system or device having an IP address;

instructions for obtaining a first response comprising information identifying at least a portion of an identified set of documents, accessible via the Internet, that match the search query;

instructions for determining whether the search query meets predefined criteria associated with current time inquiries and does not specify a location;

instructions for execution when the search query is determined to meet the predefined criteria associated with current time inquiries and if the search query does not specify a location, for determining a location associated with the IP address of the client system or device, for generating a second response specifying a current time at the location associated with the IP address of the client system or device, and for returning to the client system or device the first response and the second response for simultaneous display at the client system or device; and instructions for execution when the search query is determined not to meet the predefined criteria associated with current time inquires, for returning to the client system or device the first response for display at the client system or device.

31. The computer program product of claim 30, wherein the second response includes the current time at a plurality of locations within a country associated with the location associated with the IP address of the client system or device.

32. The computer program product of claim 30, wherein the second response includes an image of an analog clock having hands indicating the current time at the location associated with the IP address of the client system or device and text having a digital representation of the current time at the location.

\* \* \* \* \*